US006372108B1

(12) United States Patent
Hoenig et al.

(10) Patent No.: US 6,372,108 B1
(45) Date of Patent: Apr. 16, 2002

(54) BINDERS FOR USE IN CATHODIC ELECTRODEPOSITION COATINGS, PROCESS FOR THEIR PREPARATION AND CATHODIC ELECTRODEPOSITION COATING COMPOSITIONS CONTAINING SAME

(75) Inventors: Helmut Hoenig, Kumberg; Roland Feola, Graz; Johann Gmoser, Graz; Robert Thausz, Graz, all of (AT)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/571,144

(22) Filed: May 16, 2000

(51) Int. Cl.$^7$ ............................................. C25D 13/06
(52) U.S. Cl. ........................ 204/501; 204/504; 523/415
(58) Field of Search ................... 204/499, 501, 204/504; 523/415

(56) References Cited

U.S. PATENT DOCUMENTS 4,484,994 A    11/1984   Jacobs, III et al.
4,528,363 A    7/1985    Tominaga
4,542,173 A    9/1985    Schupp et al.
4,931,157 A  * 6/1990    Valko et al. ................ 204/505

FOREIGN PATENT DOCUMENTS

| DE | 3246812 A1 | 10/2001 |
| EP | 0 102 566 A1 | 3/1984 |
| EP | 0280815 A2 | 9/1988 |
| EP | 0333327 A1 | 9/1989 |
| WO | WO 93/02231 | 2/1993 |

* cited by examiner

Primary Examiner—Kishor Mayekar
(74) Attorney, Agent, or Firm—Steven C. Benjamin

(57) ABSTRACT

Novel alkaline polymeric binders, preferably amino epoxy binders, for use in cathodic electrodeposition coatings have a number average molecular mass of 1000 to 3000, an amine value of 150 to 250 mg KOH/g binder and 50 to 230 milliequivalents/100 g binder of beta-hydroxyalkyl urethane groups of the formula $HOC_nH_{2n}OC(O)NH-$ where n=2 to 3, as well as processes for making such binders; aqueous compositions, particularly cathodic electrodeposition compositions containing such binders (which provide improved throwing power); and process of using such compositions, particularly on automotive bodies and parts thereof, are disclosed.

4 Claims, No Drawings

BINDERS FOR USE IN CATHODIC ELECTRODEPOSITION COATINGS, PROCESS FOR THEIR PREPARATION AND CATHODIC ELECTRODEPOSITION COATING COMPOSITIONS CONTAINING SAME

BACKGROUND OF THE INVENTION

The invention relates to polymeric binders and, more particularly, to polymeric binders having particular utility in cathodic electrodeposition coatings ("cathodic electrodeposition binders").

The cathodic electrodeposition coating process is a coating process which is used in particular for applying corrosion protection primer layer:s on metallic substrates, wherein the substrate acts as the cathode. The particular suitability of the cathodic electrodeposition coating process for this purpose is due to its ability to coat three-dimensional substrates with a complicated geometry, such as for example automotive bodies. One essential property of a cathodic electrodeposition ("CED") coating composition in this context is its throwing power behavior. "Throwing power" is a term of art used to identify the ability of an electrodeposition coating agent to be deposited within voids of a three-dimensional substrate, which is significant for effective corrosion protection.

CED-coating compositions containing binders with active hydrogen atoms and beta-hydroxyurethane compounds as cross-linking agents are known from EP-A-0 102 566. The beta-hydroxyurethanes can be prepared by reacting isocyanate compounds with 1,2-polyols. Such coating compositions can be cured at low temperatures.

WO 93/02231 describes CED-coating compositions, which contain binders with active hydrogen atoms and gamma-hydroxyurethaie compounds as cross-linking agents. The gamma-hydroxyurethanes can be prepared by reacting isocyanate compounds with 1,3-polyols. The CED-coating compositions can be cured at low temperatures and are notable for their excellent throwing power.

SUMMARY OF THE INVENTION

It is an object of the present invention to increase the throwing power of CED coating compositions. This objective is accomplished according to the invention by providing novel alkaline polymeric binders containing beta-hydroxyalkyl urethane groups and CED coating compositions containing same.

Thus, in one embodiment, the invention provides a polymeric binder for use in cathodic electrodeposition coatings, said binder having a number average molecular mass of 1000 to 3000, an amine value of 150 to 250 mg KOH/g binder and 50 to 230 milliequivalents/100 g binder of beta-hydroxyalkyl urethane groups of the formula $HOC_nH_{2n}OC(O)NH-$ where n=2 to 3.

In another embodiment, the invention provides a process of making polymeric cathodic electrodeposition binders having a number average molecular mass of 1000 to 3000, an amine value of 150 to 250 mg KOH/g binder and 50 to 230 milliequivalents/100 g binder of beta-hydroxyalkyl urethane groups of the formula $HOC_nH_{2n}OC(O)NH-$ where n=2 to 3, said process comprising the step of reacting a compound having at least one primary amino group with a carbonate compound selected from the group consisting of ethylene carbonate, propylene carbonate, and mixtures thereof.

In yet another embodiment, the invention provides a process of making polymeric cathodic electrodeposition binders having a number average molecular mass of 1000 to 3000, an amine value of 150 to 250 mg KOH/g binder and 50 to 230 milliequivalents/100 g binder of beta-hydroxyalkyl urethane groups of the formula $HOC_nH_{2n}OC(O)NH-$ where n=2 to 3, said process being selected from the group consisting of radical polymerization, condensation polymerization and addition polymerization and comprising the step of polymerizing at least one compound which contains at least one beta-hydroxyalkyl urethane group of the formula $HOC_nH_{2n}OC(O)NH-$ where n=2 to 3 and at least one further fictional group.

In a further embodiment, the invention provides an aqueous binder composition comprising at least one polymeric cathodic electrodeposition binder having a number average molecular mass of 1000 to 3000, an amine value of 150 to 250 mg KOH/g binder and 50 to 230 milliequivalents/100 g binder of betahydroxyalkyl urethane groups of the formula $HOC_nH_{2n}OC(O)NH-$ where n=2 to 3 and water, wherein said at least one binder has been neutralized with an acid.

In still another embodiment of the invention, provided is a cathodic electrodeposition coating composition comprising at least one polymeric binder having a number average molecular mass of 1000 to 3000, an amine value of 150 to 250 mg KOH/g binder and 50 to 230 milliequivalents/100 g binder of betahydroxyalkyl urethane groups of the formula $HOC_nH_{2n}OC(O)NH-$ where n=2 to 3, and wherein said at least one polymeric binder is present in an amount of 3 to 10 wt-% based on the total resin solids in said composition.

In yet another embodiment, the invention provides a process for coating electrically conductive substrates by cathodic electrodeposition comprising the steps of applying a cathodic electrodeposition coating to a substrate surface, wherein said coating comprises at least one polymeric binder having a number average molecular mass of 1000 to 3000, an amine value of 150 to 250 mg KOH/g binder and 50 to 230 milliequivalents/100 g binder of beta-hydroxyalkyl urethane groups of the formula $HOC_nH_{2n}OC(O)NH-$ where n=2 to 3, and wherein said at least one polymeric binder is present in an amount of 3 to 10 wt-% based on the total resin solids in said composition; and then baking the coated substrate.

DETAILED DESCRIPTION OF THE EMBODIMENTS

The polymeric binders according to the invention are cathodic electrodeposition binders (hereinafter sometimes referred to as "CED-binders"). The binders are alkaline polymers having an amine value of 150 to 250, preferably 180 to 220 mg KOH/g binder. The amine value is derived from primary, secondary and/or tertiary amino groups of the CED-binders. The CED-binders also contain betahydroxyalkyl urethane groups of the formula $HOC_nH_{2n}OC(O)NH-$, where n=2 to 3. The beta-hydroxyalkyl urethane groups are present in an amount of 50 to 230 milliequivalents ("meq")/100 g of binder, preferably 60 to 150 meq/100 g binder. Such groups are more particularly known as beta-hydroxyethyl urethane and beta-hydroxypropyl urethane. Combinations of such groups may, of course, also be present. The beta-hydroxyalkyl urethane groups are lateral and/or terminal beta-hydroxyalkyl urethane groups.

Apart from the above defined beta-hydroxyalkyl urethane groups, the binders can also contain non-terminal or non-lateral beta-hydroxyalkyl urethane groups and/or beta-hydroxyalkyl urethane groups of the following formula:

—CHOHCH$_2$OC(O)NHR; —CH(CH$_2$OH)OC(O)NHR; —CCH$_3$OHCH$_2$OC(O)NHR; —CCH$_3$(CH$_2$OH)OC(O)NHR; —CHOHCHCH$_3$OC(O)NHR; and —CH(OC(O)NHR)CHOHCH$_3$; where R can be hydrogen or a lower alkyl, for example C1–C4-alkyl.

The CED-binders can also contain additional functional groups. For example, the CED-binders may contain hydroxyl groups sufficient to provide a hydroxyl value of 200 to 500 mg KOH/g binder, (exclusive of the hydroxyl groups of the beta-hydroxyalkyl urethane moieties). Such additional hydroxyl groups can provide for the chemically cross-linking of the CED-binders in the presence of external cross-linking agents.

The CED-binders can be prepared by reacting suitable resins containing a corresponding amount of primary amino groups ("educt resins") with ethylene carbonate and/or propylene carbonate. The resins used as educt resins have a higher amine value than the CED-binders formed therewith through reaction with ethylene carbonate and/or propylene carbonate. The term "educt resins" means resins containing primary amino groups which can be converted into beta-hydroxyalkylurethane groups of the formula HOC$_n$H$_{2n}$OC(O)NH— with n=2 to 3 by reaction with ethylene carbonate and/or propylene carbonate, said conversion yielding CED-binder resins according to the invention as product resins. The amine value of the educt resins lies for example in the range of 200 to 350 mg KOH,/g resin. The amine value of the educt resins is derived from the content of primary amino groups and optionally secondary and/or tertiary amino groups. The primary amino groups can be present in a stoichiometric excess in the educt resins with a view to their reaction with ethylene carbonate and/or propylene carbonate. Apart from the amino groups, the educt resins can also have additional functional groups, for example hydroxyl groups. The reaction with the ethylene carbonate and/or propylene carbonate can be carried out in the melt or in an inert organic solution. During the reaction, primary amino groups of the educt resins are converted into betahydroxyalkyl urethane groups of the formula HOC$_n$H$_{2n}$OC(O)NH— with n=2 to 3. Where the reaction is carried out using only ethylene carbonate, n represents 2; in the case of a reaction with only propylene carbonate, n is represented by 3. Where mixtures of ethylene carbonate and propylene carbonate are used, n is comprised between 2 and 3. Examples of suitable educt resins are (meth)acryl copolymer resins, polyurethane resins or preferably amino epoxy resins or epoxide-carbon dioxide-amine reaction products, each of which comprising primary amino groups. The educt resins are selected and reacted with ethylene carbonate and/or propylene carbonate in such proportions that the CED-binders, as defined with respect to the number average molecular mass, amine value and content of beta-hydroxyethyl urethane and/or beta-hydroxypropyl urethane groups, are obtained.

It is preferred to synthesize the CED-binders by using one or more different compounds, which contain already one or more beta-hydroxyethyl urethane and/or beta-hydroxypropyl urethane groups. Examples of such compounds which can be used as educts are compounds having at least one beta-hydrox;yethyl urethane or beta-hydroxypropyl urethane group and at least one further functional group in the molecule. The at least one beta-hydroxyethyl urethane or beta-hydroxypropyl urethane group can be introduced into the educt compound by reacting a starting compound having at least one primary amino group and at least one further functional group in the molecule, which is non-reactive or comparatively weakly reactive with respect to ethylene carbonate and/or propylene carbonate, with ethylene carbonate and/or propylene carbonate. During the reaction, primary amino groups are converted into the corresponding beta-hydroxyalkyl urethane groups by ring-opening addition to the carbonate ring. Where the starting compound which is to be converted into an educt compound is a compound having more than one primary amino group in the molecule, all or only a part of the primary amino groups can be converted with ethylene carbonate and/or propylene carbonate, for example by reacting with ethylene carbonate and/or propylene carbonate in a stoichiometric amount or in an amount lower than the stoichiometric amount. Examples of functional groups which are non-reactive or which are comparatively weakly reactive with respect to ethylene carbonate and/or propylene carbonate are secondary amino groups and hydroxyl groups. Examples of starting compounds which are suitable for the preparation of the educt compounds are di- or polyamines and aminoalcohols each having at least one primary amino group in the molecule, such as 2-aminoethanol, diethylene triamine, triethylene tetraamine. The preferred starting compounds are diethylene triamine and triethylene tetraamine. A 1:2-adduct comprising a secondary amino group and two beta-hydroxyethyl urethane groups can be formed from 1 mole diethylene triamine and 2 moles ethylene carbonate. In an analogous way a 1:2-adduct having two secondary amino groups and two beta-hydroxyethyl urethane groups can be formed from 1 mole triethylene tetraamine and 2 moles ethylene carbonate.

The CED-binders can be prepared according to conventional synthesis methods, known to the person skilled in the art of CED-coatings and CED-binders, using educt compounds containing beta-hydroxyethyl urethane or beta-hydroxypropyl urethane groups, by reacting the functional groups of the educt compounds, which have not been converted with ethylene carbonate and/or propylene carbonate, with suitable reaction partners to obtain the CED-binders. Examples of suitable reactions are radical polymerisation, condensation reactions and addition reactions. The reaction partners of the educt compounds are conventional synthesis blocks known to the person skilled in the art for use in such binder synthesizing reactions. The educt compounds can be bonded as synthesis blocks in situ or in the last step of the synthesis in the sense of a polymer-analog reaction to the binders, such that they serve to provide beta-hydroxyethyl urethane or beta-hydroxypropyl urethane groups to the CED-binders. They can thereby optionally contribute at the same time to building a larger molecule for the CED-binder. The educt compounds, therefore, are either bonded to the lateral or terminal ends of the CED-binder, or the educt molecules are built into the binder structure and hence contribute towards increasing the size of the molecule. In any case the beta-hydroxyethyl urethane or beta-hydroxypropyl urethane groups of the educt compounds are introduced in their unaltered state into the CED-binders. The reactants and the reaction procedure have to be chosen accordingly. The educt compounds and their reaction partners are selected in such a manner and converted together in such proportions that CED-binders, having the desired number average molecular mass, amine value and content of beta-hydroxyethyl urethane and/or beta-hydroxypropyl urethane groups, are obtained.

With reference to the 1:2-adduct from diethylene triamine and ethylene carbonate already mentioned, it will now be explained how a binder can be provided with beta-hydroxyethyl urethane groups. Such adducts can be bound by way of their secondary amino groups for example to isocyanate groups or to epoxy groups of a binder resin. Correspondingly, the 1:2-adduct from triethylene tetraamine and ethylene carbonate can be integrated into a binder structure via its two secondary amino groups.

The CED-binders are preferably amino epoxy resins. The amino epoxy resins are addition products of amine compounds to polyepoxides. The term "amino epoxy resin" includes derivatives of amino epoxy resins such as epoxide-carbon dioxide-amine-reaction products. Epoxide-carbon dioxide-amine-reaction products are understood to mean addition products of amine compounds to partly or completely carbonatized polyepoxides. Partly or completely carbonatized polyepoxides are polyepoxides in which a part or all of the epoxy groups are converted with carbon dioxide to 5-membered cyclic carbonate groups, the so-called 2-oxo-1,3-dioxolane-4-yl-groups. The amino groups determining the amine value of 150 to 250 mg KOH/g binder can be present as substituents and/or as a component of the polymer backbone in the amino epoxy resin.

Amino epoxy resins can be prepared for example by reacting aromatic epoxy resins with primary and/or secondary mono- and/or polyarrmines as well as with suitable educt compounds having at least one beta-hydroxyethyl urethane group or beta-hydroxypropyl urethane group and at least one further functional group. The reaction can be carried out in an organic solution or in the melt. If it is carried out in an organic solution, water-miscible solvents can be used as solvents or solvent mixtures, e.g. alcohols, such as isopropanol, isobutanol, n-butanol; glycol ethers such as methoxypropanol, butoxyethanol; glycol ether esters such as butyl glycol acetate, or solvents which are not miscible with water such as xylene can be used. Aromatic epoxy resins are aromatic epoxy group-containing polyglycidyl ethers. Aromatic polyglycidyl ethers result for example from the reaction of polyphenols, preferably diphenols and in particular polynuclear diphenols with epichlorhydrin. The aromatic epoxy resins preferably used for the synthesis of amino epoxy resins are those, or the mixture of those which have an epoxy- and/or a cyclocarbonate-weight equivalent between 170 and 1000. Preferred aromatic epoxy resins, which are commercially available, are those which result primarily from the reaction of diphenylolpropane (bisphenol A) with epichlorhydrin.

The mono- and/or polyamines can contain, apart from the primary and/or secondary amino groups, also additional functional groups, in particular hydroxyl groups and/or tertiary amino groups. Examples of mono- and/or polyamines with primary and/or secondary amino groups and optionally further functional groups are methylamine, ethylamine, propylamine, butylamine, octylamine, 2-ethylhexylamine, dimethylamine, diethylamine, dipropylamine, dibutylamine, methylbutylamine, morpholine, diethylaminoethylamine, dimethylaminopropylamine, laurylpropylene diamine, diethylene triamine, N,N'-bis-(isohexyl)-1,6-diaminohexane, ethanolamine, propanolamine, ethylene glycol(2-amino-ethyl)ether, N-methylaminoethanol or diethanolamine, 1:2-adducts from a diprimary amine such as 1,6-diaminohexane or 2-methylpentamethylene diamine and monoepoxides such as glycidyl ethers or esters or monoepoxyalkanes. The educt compounds having at least one bet:-hydroxyethyl urethane group or beta-hydroxypropyl urethane group and at least one further functional group are those which have been already explained above. Preferred are those educt compounds which have at least one primary or secondary amino group as the at least one further functional group. They can be built into the amino epoxy resins via the latter. Preferred examples are the 1:2-adduct from 1 mole diethylene triamine and 2 moles ethylene carbonate or propylene carbonate as well as the 1:2-adduct from 1 mole triethylene tetraamine and 2 moles ethylene carbonate or propylene carbonate.

The CED-binders can be neutralized with an acid according to a theoretical degree of neutralization of for example 10 to 100% and converted with water into an aqueous dispersion or solution with a resin solids content of for example 30 to 50 wt-%. In order to obtain a sufficient water-dilutability (i.e., water-solubility or water-dispersibility), a low degree of neutralization is already sufficient, for example already at a concentration corresponding to an acid content of 40 meq/ 100 g of CED-binder.

The CED-binders can be used in amounts of 3 to 10 wt-% (based on the total weight of resin solids) as supplementary binders in CED-coating compositions to improve the throwing power of such compositions. It is therefore a further object of the invention to provide CED-coating compositions which contain 3 to 10 wt-%, based on total resin solids content, of one or more of the CED-binders.

The CED-coating compositions according to the invention are aqueous coating compositions having a total solids content of, for example, from 10 to 30 wt-%. One component of the total solids content is the resin solids content and the other is comprised of the optional extenders, pigments and non-volatile additives that may be, and typically are, used in such coating compositions. The resin solids content itself consists of the one or more CED-binders according to the invention, one or more cathodically depositable binders, which are different from the CED-binders according to the invention (hereinafter refered to as "cathodically depositable binders") and optional additives that may be employed, such as pigment paste resins, cross-linking agents and non-ionic resins. The cathodically depositable binders may be self-cross-linking or external cross-linking and they contain no beta-hydroxyethyl or beta-hydroxypropyl urethane groups.

The resin solids content of a typical CED coating composition according to the invention may contain, for example, 3 to 10 wt-% CED-binder(s), 50 to 97 wt-% cathodically depositable binder(s), 0 to 40 wt-% cross-linking agent and 0 to 10 wt-% non-ionic resins. The preferred resin solid content is 3 to 10 wt-% CED-binder(s), 50 to 87 wt-% external cross-linking cathodically depositable binder(s), 10 to 40 wt-% cross-linking agent and 0 to 10 wt-% non-ionic resins.

The cathodically depositable binders are preferably those binders carrying cationic groups or groups which can be converted into cationic groups, such as amino groups, ammonium groups (e.g., quaternary ammonium), phosphonium groups and/or sulfonium groups. Preferred are binders with alkaline groups, in particular preferably with nitrogen-containing alkaline groups, such as primary, secondary and/or tertiary amino groups, whose amine value is for example from 20 to 250 mg KOH/g of binder. These groups can be present in the quaternized form, or they are converted into cationic groups with a conventional neutralizing agent, such as, for example, lactic acid, formic acid, acetic acid, methane sulfonic acid. The groups able to be converted into cationic groups may be present in their completely or partially neutralized state.

The weight average molecular mass (Mw) of the cathodically depositable binders is preferably from 300 to 10000. The binders may be self-crosslinking or, preferably, external cross-linking and carry functional groups capable of chemical cross-linking, in particular hydroxyl groups, for example corresponding to a hydroxyl value of 30 to 300, preferably 50 to 250 mg KOH/g of binder. The cathodically depositable binders can be converted into the aqueous phase after the quaternization or neutralization of at least part of the alkaline groups. Examples of suitable cathodically depositable binders include amino(meth)acrylate resins, aminopolyurethane resins, amino group-containing polybutadiene resins, epoxy resin-carbon dioxide-amine-reaction products and in particular amino epoxy resins, for example, amino epoxy resins having terminal double bonds or amino epoxy resins having primary OH-groups.

Examples of suitable cross-linking agents that may be used in the CED coating compositions include aminoplast resins, cross-linking agents having terminal double bonds, polyepoxide compounds, cross-linking agents containing groups which are capable of transesterification and/or transamidation, and in particular polyisocyanates, which are blocked by compounds comprising an active hydrogen group. Examples of compounds having an active hydrogen group are monoalcohols, glycol ethers, ketoximes, lactames, malonic acid esters and aceto-acetic esters.

The CED-binders as well as the cathodically depositable binders can be converted into a CED-binder dispersion, and be used as such for the preparation of CED-coating compositions according to the invention. The binders can be used as separate dispersions or in the form of a CED-dispersion containing both, CED-binders and cathodically depositable binders. The preparation of CED-dispersions is known to the person skilled in the art. CED-dispersions can be prepared for example by converting CED-binders into an aqueous dispersion by neutralizing with an acid and diluting with water. The CED-binders and/or the cathodically depositable binders can thereby be present in a mixture with cross-linking agents and can be converted together with the latter into an aqueous dispersion. Organic solvent, where present, may be removed, for example by vacuum distillation, before or after conversion into the aqueous dispersion, until the desired content is achieved.

The subsequent removal of solvents can be avoided, for example, if the CED coating binders are neutralized in the low-solvent or solvent-free state, for example as a solvent-free melt, with neutralizing agent and are afterwards converted with water into the CED coating binder dispersion. It is likewise possible to avoid the removal of organic solvents, if the CED coating binders are charged as a solution in one or more olefinically unsaturated monomers which are polymerizable by free radical polymerization, and the solution is afterwards converted into an aqueous dispersion by neutralization with neutralizing agent and dilution with water, followed by a subsequent radical polymerization of the monomer(s).

The CED-coating compositions can contain additives, which are known in particular for CED-coating compositions, for example in amounts of 0.1 to 5 wt-%, based on the resin solids. Examples are wetting agents, neutralizing agents, levelling agents, catalysts, corrosion inhibitors, defoamers, light protecting agents, antioxidants, solvents and conventional anti-crater additives.

The CED-coating compositions may or may not contain pigments and/or extenders. The ratio by weight of pigment plus extender/resin solids of the CED-coating compositions is for example from 0:1 to 0.8:1, and for pigmented CED-coating compositions preferably is between 0.05:1 and 0.4:1. Examples of pigments and extenders are the conventional inorganic and/or organic color pigments and/or effect-giving pigments and/or extenders, such as, for example, titanium dioxide, iron oxide pigments, carbon black, phthalocyanine pigments, chinacridon pigments, metal pigments, interference pigments, kaolin, talcum, silicon dioxide or corrosion protection pigments.

The CED-coating compositions can be prepared according to the known processes for preparing CED-baths, i.e. principally by way of the so-called one-component-process as well as the so-called two-component-process.

CED-coating compositions according to the one-component-process can for example be prepared by dispersing pigments and/or extenders in one part of the binder and/or cross-linking agent and by then grinding them for example in a bead mill, and the preparation is thereafter completed by mixing them with the other part of the binder and/or cross-linking agent. The CED-coating composition can then be prepared from this material— after neutralization— by dilution with water.

CED-coating compositions can for example also be made according to the two-component-process by preparing a pigmented CED-coating composition from a binder dispersion by mixing it with a separate pigment paste.

CED-coating compositions according to the invention can also be prepared by adding a CED-binder to a CED-coating composition. A CED-binder, in particular in the form of a CED-binder-dispersion, can for example be added subsequently to a CED-coating composition, which is ready for coating, for example in the sense of adding a correcting agent which will improve the throwing power. If a CED-binder is subsequently added, it must be ensured that the addition constitutes a part of 3 to 10 wt-% of the CED-binder on the resin solids of the CED-coating composition.

CED-layers can be deposited from the CED-coating compositions according to the invention in conventional manner on electrically conductive substrates, for example metal substrates, switched as the cathode, for example to a dry film thickness of 10 to 30 pm, and baked at object temperatures of, for example 150° C. to 190° C.

The CED-coating compositions according to the invention are characterized by their excellent throwing power behavior and are therefore suitable in particular for coating three-dimensional substrates with voids. The CED-coating compositions according to the invention are therefore suitable in particular in the automotive sector, for example for corrosion protective priming of automotive bodies or automotive body parts.

EXAMPLES

Example 1 (Comparative Example)

220 g nonylphenol (1 mole), 130 g diethylaminopropylamine (1 mole) and 100 g toluene were mixed and heated to 75° C. 33 g paraformaldehyde (91%, 1 mole) were added while the batch was slightly cooled. After distilling off 21 g reaction water by azeotropic distillation, the toluene was distilled off under vacuum. After dilution with 167 g diethylene glycol dimethyl ether, 304 g (1 mole) of toluylene diisocyanate, which was half-blocked with 2-ethylhexanol, was added to the solution at 30° C. to 40° C. and was reacted at 40° C. until a NCO-value of 0 was reached. 835 g of the thus obtained solution were converted with a solution of 475 g of an epoxy resin based on bisphenol A (epoxy equivalent weight 475) in 200 g propylene glycol monomethyl ether until an epoxy value of 0 was reached. 1240 g of the thus obtained solution were converted by addition of formic acid and deionized water into a 15% by weight aqueous dispersion having an acid content of 34 milliequivalents per 100 g solid.

In a 10-liter bath of the thus obtained CED-clear coat, a throwing power ids box, assembled from test sheets of bodywork steel and switched as the cathode which was immersed to a depth of 27 cm, was coated at a deposition voltage of 300V for 2 minutes at 30° C., and was baked at 180° C. (object temperature) after rinsing with deionized water. Analysis of the coating results was carried out according to VDA-recommendation 621–180. The CED-film thickness on the outside of the throwing power box was 20 $\mu$m. The 5 $\mu$m-limit serving as a measure of the achieved throwing power for the inner film thickness was 11.5 cm.

Example 2

176 g (2 moles) ethylene carbonate were added to 145 g (1 mole) triethylene tetraamine at a maximum temperature of 60° C. and were quantitatively converted at 100 ° C. Thereafter the batch was diluted with 138 g methoxypropanol.

460 g of the thus obtained solution were mixed with 646 g methoxypropanol, 247 g water, 210 g (2 moles) diethanolamine and 130 g (1 mole) diethylaminopropylamine. 998 g of an epoxy resin based on bisphenol A (epoxyweight equivalent 190) were slowly added to the mixture during one hour and were quantitatively converted at 70° C. until an epoxide+amine-value of 3.45 was reached. By addition of formic acid and deionized water, a solid content of 15 wt-% and an acid content of 50 meq per 100 g solids were obtained.

Example 3

500 ml were taken out of the 10 liters of CED-clear coat of Example 1, and were replaced by 500 ml of the product obtained in Example 2. After thorough mixing, the CED-coating process was carried out with the thus obtained 10 liter CED-bath under the conditions described in Example 1. Analysis of the coating results was carried out as in Example 1. The CED-film thickness on the outside of the throwing power box was 20 $\mu$m. The 5 $\mu$m-limit serving as a measure of the achieved throwing power for the inner film thickness was 18 cm.

What is claimed is:

1. An electrodeposition coating composition comprising an aqueous binder composition comprising an aqueous medium and at least one polymeric cathodic electrodeposition binder of an amino epoxy polymer having a number average molecular mass of 1,000 to 3,000, an amine value of 150 to 250 mg KOH/g binder and 50 to 230 milliequivalents/100 g binder of beta-hydroxyalkyl urethane groups of the formula $HOC_nH_{2n}OC(O)N$— where n=2 to 3, wherein said at least one binder has been neutralized with an acid and provides the composition with increased throwing power and wherein the at least one polymeric binder is present in an amount of 3 to 10 wt-%, based on the weight of the total resin solids of the composition.

2. A process for coating electrically conductive substrates by cathodic electrodeposition comprising the steps of applying a cathodic electrodeposition coating to a substrate surface, wherein said coating comprises an aqueous medium and at least one polymeric cathodic electrodoposition binder of an amino epoxy polymer having a number average molecular mass of 1,000 to 3,000, an amine value of 150 to 250 mg KOH/g binder and 50 to 230 milliequivalents/100 g binder of beta-hydroxyalkyl urethane groups of the formula $HOC_nH_{2n}OC(O)NH$— where n=2 to 3, and wherein said at least one binder has been neutralized with an acid and provides the composition with increased throw,; power and wherein the at least one polymeric binder is present in an amount of 3 to 10 wt-% based on the total resin solids in the composition; and then baking the coated substrate.

3. Process of claim 2, wherein the substrates are three-dimensional substrates optionally containing voids.

4. Process of claim 3, wherein the three-dimensional substrates are automotive bodies and parts thereof.

* * * * *

UNITED STATES PATENT AND TRADEMARK OFFICE
CERTIFICATE OF CORRECTION

PATENT NO.   : 6,372,108 B1
DATED        : April 26, 2002
INVENTOR(S)  : Helmut Hoenig, Roland Feola, Johann Gmoser and Robert Thausz It is certified that error appears in the above-identified patent and that said Letters Patent is hereby corrected as shown below:

Column 1,
Line 16, replace "layer:s" with -- layers --.
Line 36, replace "gamma-hydroxyurethaie" with -- gamma-hydroxyurethane --.

Column 2,
Line 13, replace "fictional group" with -- functional group --.

Column 3,
Line 59, replace "hydrox;yethyl" with -- hydroxyethyl --.

Column 5,
Line 22, replace "polyarrmines" with -- polyamines --.

Column 8,
Line 37, replace "30 pm" with -- 30 µm --.

Column 9,
Line 2, remove "ids".
Line 14, replace "145" with -- 146 --.

Column 10,
Line 12, replace "$HOC_nH_{2n}OC(O)N$" with -- $HOC_nH_{2n}OC(O)NH$ --.
Line 22, replace "electrodoposition" with -- electrodeposition --.
Line 29, replace "throw,;power" with -- throwing power --.

Signed and Sealed this

Eighteenth Day of June, 2002

*Attest:*

JAMES E. ROGAN
*Attesting Officer*   Director of the United States Patent and Trademark Office